US010180558B2

(12) United States Patent
Chang et al.

(10) Patent No.: US 10,180,558 B2
(45) Date of Patent: Jan. 15, 2019

(54) IMAGING MODULE AND ELECTRONIC DEVICE USING THE SAME

(71) Applicant: ABILITY ENTERPRISE CO., LTD., New Taipei (TW)

(72) Inventors: Yen-Min Chang, New Taipei (TW); Chien-Hsin Lien, New Taipei (TW); Chih-Chieh Yu, New Taipei (TW); Cheng-En Lu, New Taipei (TW); Hsien-Feng Lin, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 202 days.

(21) Appl. No.: 14/875,649

(22) Filed: Oct. 5, 2015

(65) Prior Publication Data

US 2016/0154200 A1    Jun. 2, 2016

(30) Foreign Application Priority Data

Nov. 28, 2014  (TW) .............................. 103141347 A

(51) Int. Cl.
| | |
|---|---|
| *G02B 7/02* | (2006.01) |
| *G03B 17/12* | (2006.01) |
| *H04N 5/225* | (2006.01) |
| *G02B 27/64* | (2006.01) |
| *G03B 29/00* | (2006.01) |

(52) U.S. Cl.
CPC ............ *G02B 7/026* (2013.01); *G02B 27/646* (2013.01); *G03B 17/12* (2013.01); *H04N 5/2254* (2013.01); *G03B 29/00* (2013.01)

(58) Field of Classification Search
CPC ......... G02B 7/026; G02B 7/022; G02B 7/023
See application file for complete search history.

(56) References Cited

U.S. PATENT DOCUMENTS

| | | | |
|---|---|---|---|
| 4,238,845 A | 12/1980 | Haggard et al. | |
| 6,943,966 B2 * | 9/2005 | Konno | ............... G02B 7/023 |
| | | | 359/813 |
| 7,590,341 B2 | 9/2009 | Iijima et al. | |
| 2006/0028320 A1 | 2/2006 | Osaka | |

FOREIGN PATENT DOCUMENTS

| | | |
|---|---|---|
| CN | 1831576 A | 9/2006 |
| CN | 1910492 A | 2/2007 |
| CN | 101630890 A | 1/2010 |
| CN | 2014-49483 U | 5/2010 |
| CN | 2015-22306 U | 7/2010 |
| CN | 202018532 U | 10/2011 |
| CN | 203365776 U | 12/2013 |
| EP | 1698925 A1 | 9/2006 |
| JP | 2005-128392 A | 5/2005 |
| TW | 2010-38970 A | 11/2010 |
| TW | 2013-19612 A | 5/2013 |

OTHER PUBLICATIONS

Chinese Office Action dated Mar. 20, 2018.
Taiwanese Office Action dated Aug. 6, 2018.

* cited by examiner

*Primary Examiner* — Joseph P Martinez
(74) *Attorney, Agent, or Firm* — Rabin & Berdo, P.C.

(57) ABSTRACT

An image module and an electronic device using the same are provided. The image module includes a connecting element and a lens structure. The connecting element includes an inner ring, an outer ring and a connecting portion. The connecting portion connects the inner ring and the outer ring. The lens structure is mounted in the inner ring.

21 Claims, 7 Drawing Sheets

IMAGING MODULE AND ELECTRONIC DEVICE USING THE SAME

This application claims the benefit of Taiwan application Serial No. 103141347, filed Nov. 28, 2014, the subject matter of which is incorporated herein by reference.

BACKGROUND

Technical Field

The invention relates in general to a module and an electronic device using the same, and more particularly to an image module and an electronic device using the same.

Description of the Related Art

The image device, such as hand-held communication system, digital camera, digital video recorder or sport video recorder, mainly integrates the image module and the image sensor. The image device collects and converts light beams into electronic signals of images which may be conveniently stored, processed and transmitted in subsequent processing. When capturing an image, the image device is basically in a hand-held state. Under such circumstance, the image module may be wobbling or vibrating, and result in image distortion.

Therefore, it has become an imminent task for the industries to provide a new image module, which, when capturing an image, is capable of reducing the negative influence caused by vibration.

SUMMARY

The invention is directed to an image module and an electronic device using the same. When capturing an image, the image module is capable of reducing negative influence caused by vibration.

According to one embodiment of the invention, an image module is provided. The image module includes a connecting element and a lens structure. The connecting element includes an inner ring, an outer ring and a connecting portion. The connecting portion connects the inner ring and the outer ring. The lens structure is mounted in the inner ring.

According to another embodiment of the invention, an electronic device is provided. The electronic device includes an image module. The image module includes a connecting element and a lens structure. The connecting element includes an inner ring, an outer ring and a connecting portion. The connecting portion connects the inner ring and the outer ring. The lens structure is mounted in the inner ring.

The above and other aspects of the invention will become better understood with regard to the following detailed description of the preferred but non-limiting embodiment(s). The following description is made with reference to the accompanying drawings.

DETAILED DESCRIPTION

Figure 1:
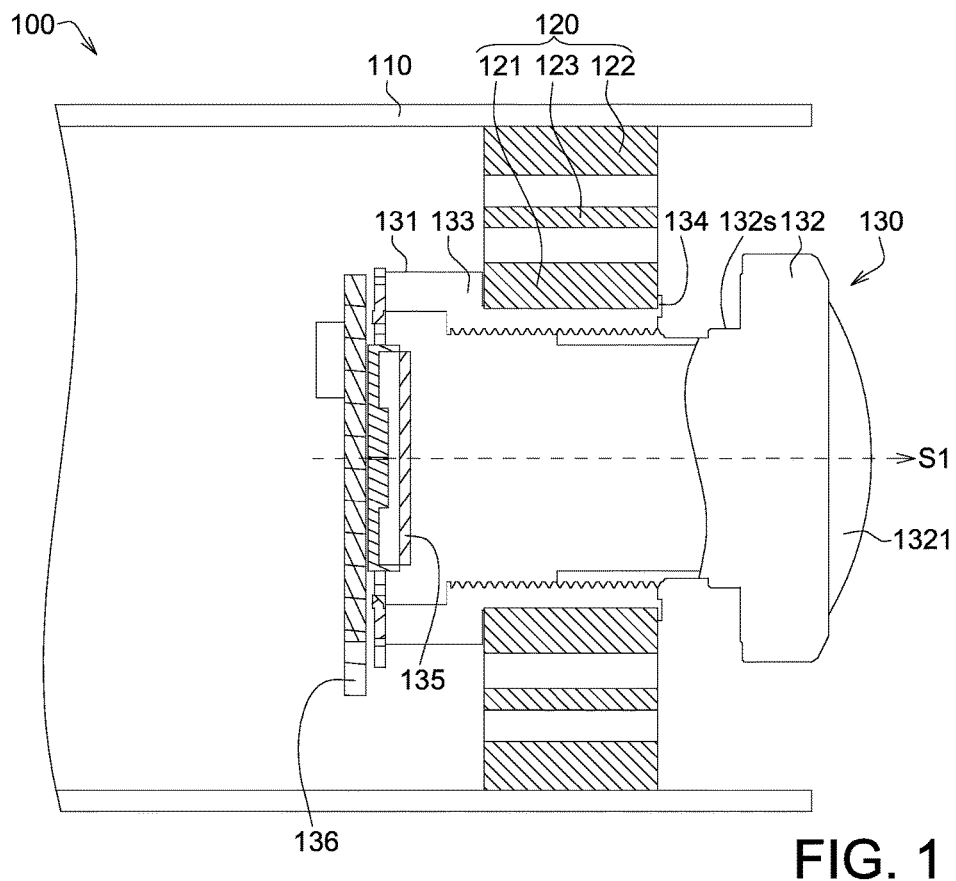
FIG. 1 is a cross-sectional view diagram of an image module according to an embodiment of the present invention.
Figure 2:
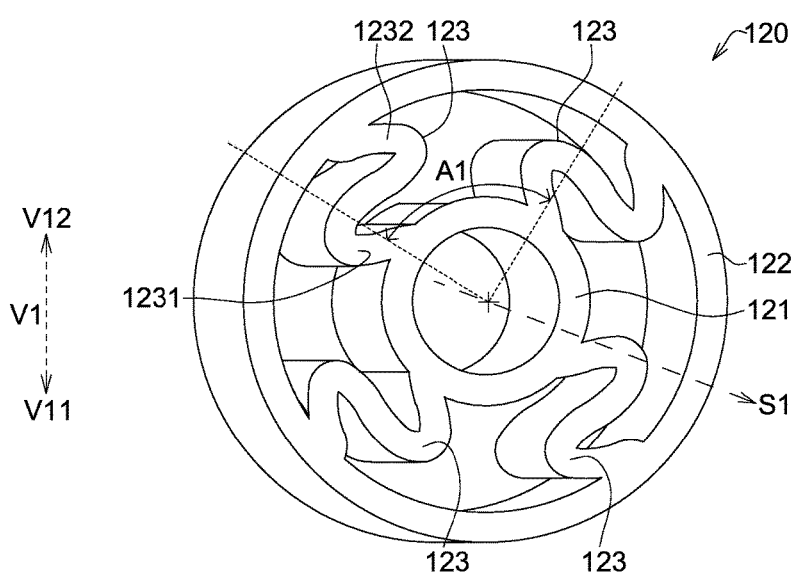
FIG. 2 is a schematic diagram of a connecting element of FIG. 1.

FIG. 1 is a cross-sectional view of an image module 100 according to an embodiment of the present invention. FIG. 2 is a schematic diagram of a connecting element 120 of FIG. 1. As indicated in FIG. 1 and FIG. 2, the image module 100 may be built in an electronic device (not illustrated) as a component or an accessory of the electronic device. Exemplarily but not restrictively, the said electronic device may be realized by a mobile system (such as mobile phone, notebook computer and the like), a transportation equipment (such as automotive panorama assisting system, around view monitor system, event data recorder and the like) and a wearable system (such as camera glasses, camera helmet and the like).

The image module 100 includes a base 110, a connecting element 120 and a lens structure 130. The connecting element 120 is disposed in the base 110. The lens structure 130 is mounted in the connecting element 120. The base 110 and the lens structure 130 are interconnected in accordance with the connecting element 120. The connecting element 120 and the base 110 may lean on each other. In an embodiment, the connecting element 120 may be fixed on the base 110 by way of adhesive dispensing, tight-fitting or uni-body formation.

Refer to FIG. 1 and FIG. 2 at the same time. The connecting element 120 includes an inner ring 121, an outer ring 122 and a connecting portion 123. The connecting element 120 has an axis. The inner ring 121 and the outer ring 122 of the connecting element 120 extend along an axial direction S1 to form a double-column structure of the connecting element 120. Besides, the axis (not illustrated) of the columnar structure of the inner ring 121 and the axis (not illustrated) of the columnar structure of the outer ring 122 may overlap with each other, remain substantially in parallel and separate from each other by an interval, or intersect at an angle. Given that the connecting element 120 includes a plurality of the connecting portions 123, each connecting portion 123 may be formed of the same or different materials, and may be respectively in the form of substantially equivalent or non-equivalent length to connect the inner ring 121 and the outer ring 122.

In an embodiment, the double-column structure formed by the outer ring 122 and the inner ring 121 may be disposed in a co-axial manner, and the connecting portion 123 may connect the inner ring 121 and the outer ring 122. The lens structure 130 may be mounted in the inner ring 121, and tightly engaged with the inner ring 121 by way of leaning or fixing. Since the base 110, the connecting element 120 and the lens structure 130 are interconnected, the image module 100 may produce a damping effect in accordance with the connecting portion 123.

For example, the connecting element 120 may be made of silicone, rubber, latex, plastics or metal, or a mixture or compound doped with at least one of silicone, rubber, latex, plastics and metal. Furthermore, the inner ring 121, the outer ring 122 and the connecting portion 123 may be made of the same material. Alternatively, the inner ring 121, the outer ring 122 and the connecting portion 123 may be respectively made of at least two different materials. For example, the inner ring 121 and/or the outer ring 122 may be made of plastics or metal, and the connecting portion 123 may be made of silicon, latex, rubber or a material capable of producing damping effect. When selecting a material and/or a material hardness of the inner ring 121, the outer ring 122 and the connecting portion 123, factors such as the required damping values, the total weight of the inner ring 121 and the lens structure 130, and the size of the cross-section of the connecting portion 123 need to be taken into consideration, but the present invention is not limited thereto.

Specifically, the connecting portion 123 may be circuitously disposed between the inner ring 121 and the outer ring 122 to buffer and/or reduce the shock wave coming from the base 110. In an embodiment as indicated in FIG. 2, the connecting portion 123 exemplarily has an S-like shape, but the present invention is not limited thereto. In another embodiment, the connecting portion 123 may also be substantially interposed between the inner ring 121 and the outer ring 122, such that the gap between the inner ring 121 and the outer ring 122 is far smaller than the total volume of the connecting portion 123. For example, the connecting portion 123 may interpose more than 70% of the space between the inner ring 121 and the outer ring 122. The connecting portion 123 may not need to have a fixed shape.

Furthermore, the present embodiment is exemplified by a plurality of the connecting portions 123 radially arranged in a direction perpendicular to the axial direction S1 according to the axis of the connecting elements 120 and connecting the outer ring 122 and the inner ring 121. Each connecting portion 123 includes a first end 1231 and a second end 1232. The first end 1231 connects the inner ring 121; the second end 1232 connects the outer ring 122; and an angle A1 is formed between any two adjacent connecting portions 123. Furthermore, any two adjacent angles A1 may be basically equivalent, such that the connecting portions 123 are uniformly distributed. Or, any two adjacent angles A1 may be different according to their horizontal or vertical positions on the electronic device and based on the different stress of the connecting portions 123.

In the present embodiment, the connecting element 120 provides basically an equivalent resistance to two opposite directions of the same vibration axis V1. Furthermore, when the connecting element 120 is pressed towards a first vibration direction V11, two connecting portions 123 are subjected to the stress. When the connecting element 120 is pressed towards a second vibration direction V12, again, two connecting portions 123 are subjected to the stress. Since the quantities of connecting portions 123 subjected to the stress are the same in the first vibration direction V11 and the second vibration direction V12, the connecting element 120 provides basically an equivalent resistance to two opposite directions of the vibration axis V1.

However, the present invention is not limited to the exemplification of a plurality of the connecting portions 123. In another embodiment, the connecting element 120 may have only one connecting portion 123, which connects the inner ring 121 and the outer ring 122 in the horizontal direction of the electronic device, such that the lens of the lens structure 130 mounted in the inner ring 121 is suspended in the outer ring 122.

As indicated in FIG. 1, the lens structure 130 may include a barrel 131, a lens 132, a first stopper portion 133 and a second stopper portion 134. In an embodiment, the lens 132 leans on the opening of the barrel 131 in the axial direction S1, and the lens structure 130 may further include at least one glass lens (not illustrated) disposed in the barrel 131. The barrel 131 and the lens 132 may respectively have female threads (not illustrated) and male threads (not illustrated), such that the lens 132 and the barrel 131 may rotate oppositely and move relatively along the axial direction S1 of the barrel 131. The lens 132 and the barrel 131 may even be detached from or fixed to each other. The image module 100 may further include an image capturing unit 135 and a circuit board 136. The image capturing unit 135 may be disposed on the circuit board 136. The circuit board 136 may be disposed on or lean on another opening of the barrel 131 opposite to the lens 132 in the axial direction S1. The image capturing unit 135 may be realized by a charged coupled device (CCD) or a complementary metal-oxide-semiconductor (CMOS). After an external light beam passes through the lens 1321 and the glass lens within the barrel 131, the external light beam may be projected on and sensed by the image capturing unit 135 for providing image data.

In the present embodiment, the first stopper portion 133 and the second stopper portion 134 may both be disposed on the barrel 131. The barrel 131 passes through the inner ring 121 of the connecting element 120, and the inner ring 121 may be disposed between the first stopper portion 133 and the second stopper portion 134. The first stopper portion 133, the second stopper portion 134 and the barrel 131 may be integrally formed in one piece by using injection molding technology. Or, after the barrel 131 is formed, the first stopper portion 133 and/or the second stopper portion 134 are then formed on the barrel 131. However, the present invention is not limited thereto. Besides, the first stopper portion 133 and the second stopper portion 134 may respectively be realized by ring-shaped flanges, bumps or protrusions.

In another embodiment, since the inner ring 121 and the barrel 131 are already tightly engaged with each other, the lens structure 130 may selectively omit the first stopper portion 133 and/or the second stopper portion 134.

In an alternate embodiment, the second stopper portion 134 may be disposed on the peripheral edge 132s of the lens 132, and the connecting element 120 may be disposed between the first stopper portion 133 and the second stopper portion 134.

In another alternate embodiment, the inner ring 121 and the barrel 131 are integrally formed in one piece. That is, the inner ring 121 and the barrel 131 are integrated into one component, and at least one glass lens (not illustrated) is mounted in the inner ring 121. Additionally, the second stopper portion 134 is disposed on the peripheral edge of the lens 132, and the connecting element 120 is disposed between the first stopper portion 133 and the second stopper portion 134.

Figure 3:
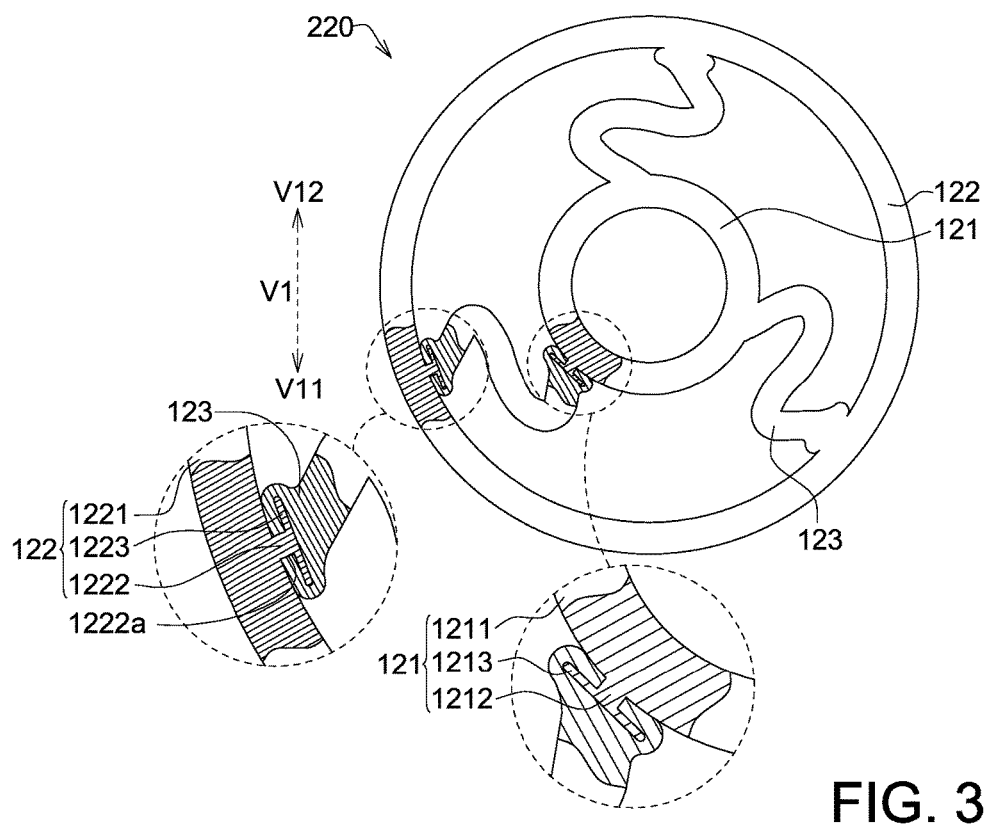
FIG. 3 is a schematic diagram of a connecting element according to another embodiment of the present invention.

FIG. 3 is a schematic diagram of a connecting element 220 according to another embodiment of the present invention. The connecting element 220 of the present invention is similar to the connecting element 120 of FIG. 2, and the same element designations and symbols are used in the present embodiment. The connecting element 220 includes three connecting portions 123. In another embodiment, the quantity of connecting portions 123 may be two, five or more than five, and is not limited to the quantity exemplified in the present embodiment.

In the present embodiment as indicated in FIG. 3, the connecting element 220 may provide two non-equivalent resistances in the same vibration axis V1. Furthermore, when the connecting element 220 is pressed towards the first vibration direction V11, two connecting portions 123 are subjected to stress. When the connecting element 220 is pressed towards the second vibration direction V12, only one connecting portion 123 is subjected to stress. Since the quantities of connecting portions 123 subjected to stress are different in two vibration directions V11, V12, the connecting element 220 provides two non-equivalent resistances in two opposite directions of the vibration axis V1.

Refer to the enlarged cross-sectional views of FIG. 3. In an alternate embodiment, the outer ring 122 includes an outer ring body 1221, a radial portion 1222 and a circumferential portion 1223. The radial portion 1222 connects the outer ring body 1221 and the circumferential portion 1223. A recess 1222a is formed between the radial portion 1222 and the circumferential portion 1223. The second end 1232 of the connecting portion 123 covers the radial portion 1222 and the circumferential portion 1223 and is partly engaged with the recess 1222a. Thus, even when the outer ring 122 and the connecting portion 123 are not integrally formed in one body or are made of different materials, the outer ring 122 and the connecting portion 123 still may be firmly connected. That is, in an embodiment, the inner ring 121 and the connecting portion 123 may be made of different materials. For example, the inner ring 121 is made of plastics or metal, and the connecting portion 123 is made of silicon, rubber or latex.

On the other hand, in another embodiment, the inner ring 121 may also include an inner ring body 1211, a radial portion 1212 and a circumferential portion 1213. The connection relationship among the radial portion 1212, the circumferential portion 1213 and the inner ring body 1211 is basically the same as that among the outer ring body 1221, the radial portion 1222 and the circumferential portion 1223, and is not repeated here. However, the present invention is not restricted by the said connection relationship.

Figure 4:
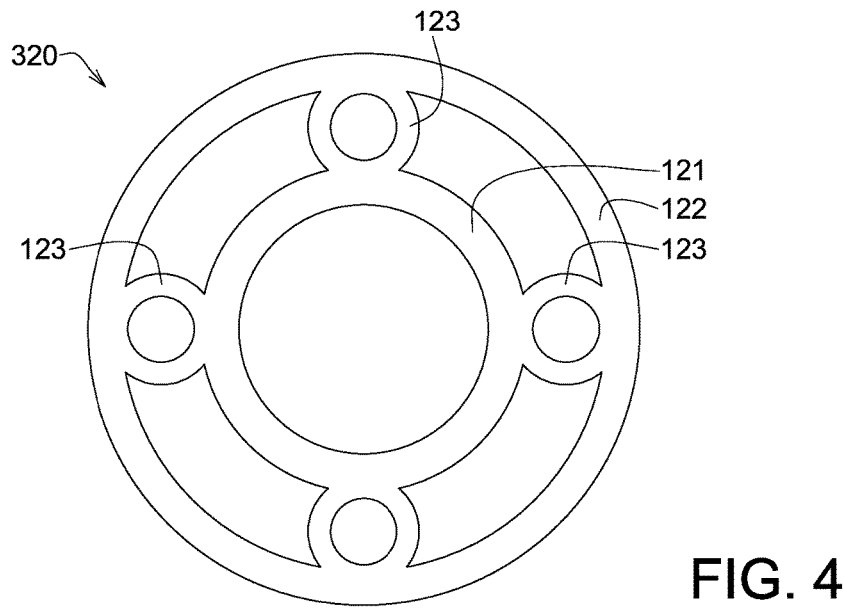
FIG. 4 is a schematic diagram of a connecting element according to another embodiment of the present invention.

FIG. 4 is a schematic diagram of a connecting element 320 according to another embodiment of the present invention. The connecting element 320 of the present embodiment is similar to the connecting element 120 of FIG. 2, and the same element designations and symbols are used in the present embodiment. The connecting portion 123 is in the shape of a closed ring, such as a closed circle, but the present invention is not limited thereto. In another embodiment, the connecting portion 123 may also be in the shape of a closed ellipse, a closed oblong, a closed triangle or other types of closed ring.

Figure 5:
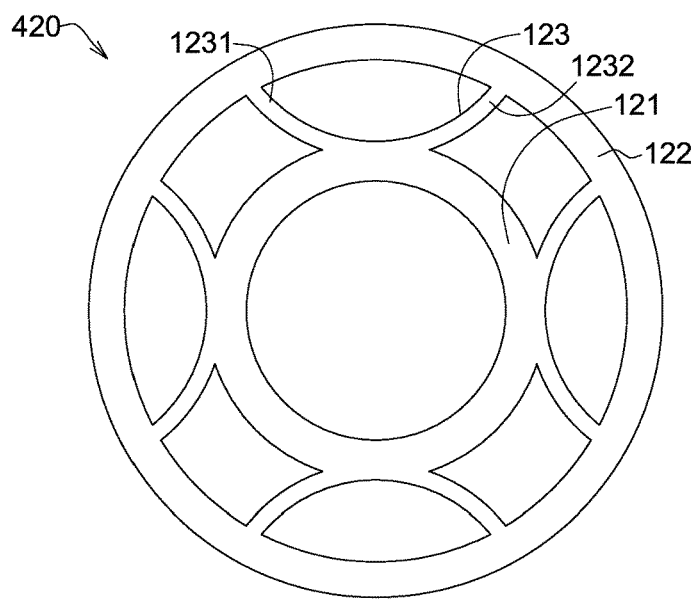
FIG. 5 is a schematic diagram of a connecting element according to another embodiment of the present invention.

FIG. 5 is a schematic diagram of a connecting element 420 according to another embodiment of the present invention. The connecting element 420 of the present embodiment is similar to the connecting element 120 of FIG. 2, and the same element designations and symbols are used in the present embodiment. In the present embodiment, the connecting portion 123 is in the shape of an open ring, such as an arch or an arc. Both the first end 1231 and the second end 1232 are both connected to the outer ring 122, and some segments between the first end 1231 and the second end 1232 of the connecting portion 123 are connected to the inner ring 121.

Figure 6:
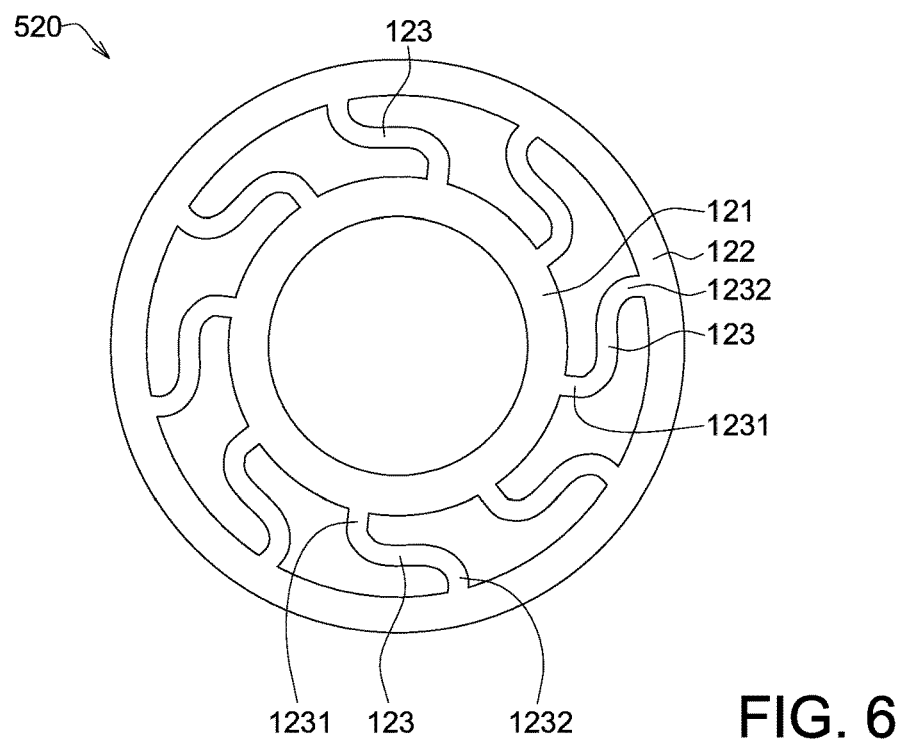
FIG. 6 is a schematic diagram of a connecting element according to another embodiment of the present invention.

FIG. 6 is a schematic diagram of a connecting element 520 according to another embodiment of the present invention. The connecting element 520 of the present embodiment is similar to the connecting element 120 of FIG. 2, and the same element designations and symbols are used in the present embodiment. In the present embodiment, the first end 1231 is basically perpendicular to the tangential direction of the inner ring 121 and connects to the inner ring 121; the second end 1232 is basically perpendicular to the tangential direction of the outer ring 122 and connects to the outer ring 122.

Figure 7:
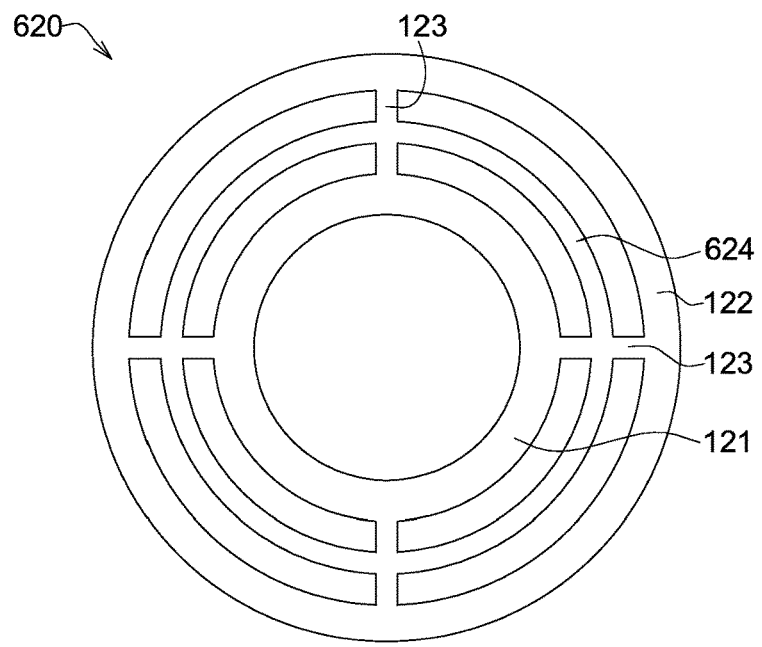
FIG. 7 is a schematic diagram of a connecting element according to another embodiment of the present invention.

FIG. 7 is a schematic diagram of a connecting element 620 according to another embodiment of the present invention. The connecting element 620 of the present embodiment is similar to the connecting element 120 of FIG. 2, and the same element designations and symbols are used in the present embodiment. The connecting element 620 further includes a bridge portion 624 connected between two connecting portions 123. In the present embodiment, the bridge portion 624 is ring-shaped and disposed between the outer ring 122 and the inner ring 121, and serially connects all connecting portions 123, but the present embodiment is not limited thereto. In another embodiment, the bridge portion 624 may be multi-arc shaped, and each bridge portion 624 serially connects two or more connecting portions 123. In an alternate embodiment, the connecting element 620 may omit or dispense with the bridge portion 624.

Figure 8:
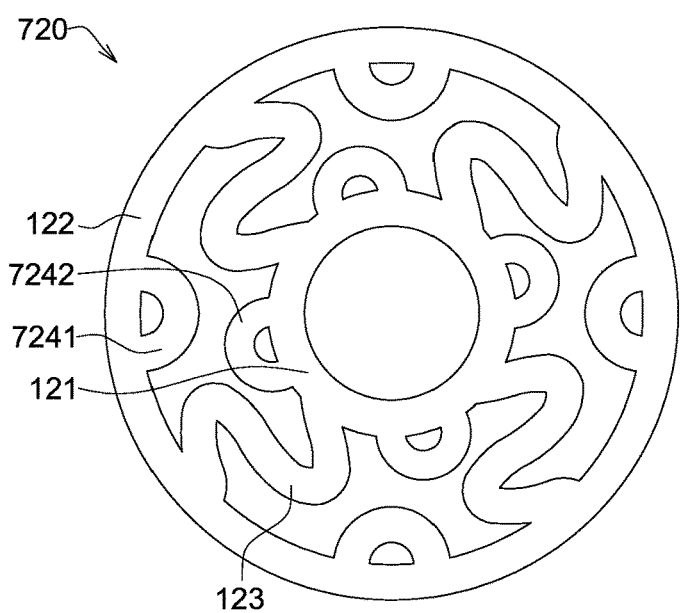
FIG. 8 is a schematic diagram of a connecting element according to another embodiment of the present invention.

FIG. 8 is a schematic diagram of a connecting element 720 according to another embodiment of the present invention. The connecting element 720 of the present embodiment is similar to the connecting elements 120 and 220 of FIG. 2 and FIG. 3, and the same element designations and symbols are used in the present embodiment. The connecting element 720 further includes a first limiting portion 7241 and a second limiting portion 7242. The connecting portion 123 connects the inner ring 121 and the outer ring 122. The first limiting portion 7241 is disposed on the inner wall of the outer ring 122 and between two adjacent connecting portions 123. The second limiting portion 7242 is disposed on the outer wall of the inner ring 121 and between two adjacent connecting portions 123. When the connecting element 720 is twisted, two connecting portions 123 may be restricted by the first limiting portion 7241 and/or the second limiting portion 7242, such that the torsion angle of the connecting element 720 will not be too large.

Refer to FIG. 8. In another embodiment, the connecting element 720 may only include one of the first limiting portion 7241 and the second limiting portion 7242. In an alternate embodiment, one or more first limiting portions 7241 and/or one or more second limiting portions 7242 may be disposed on the outer ring 122 and the inner ring 121 between an interval of two or more connecting portions 123, but the invention is not limited to have one first limiting portion 7241 and/or one second limiting portion 7242 disposed between every two connecting portions 123.

Figure 9:
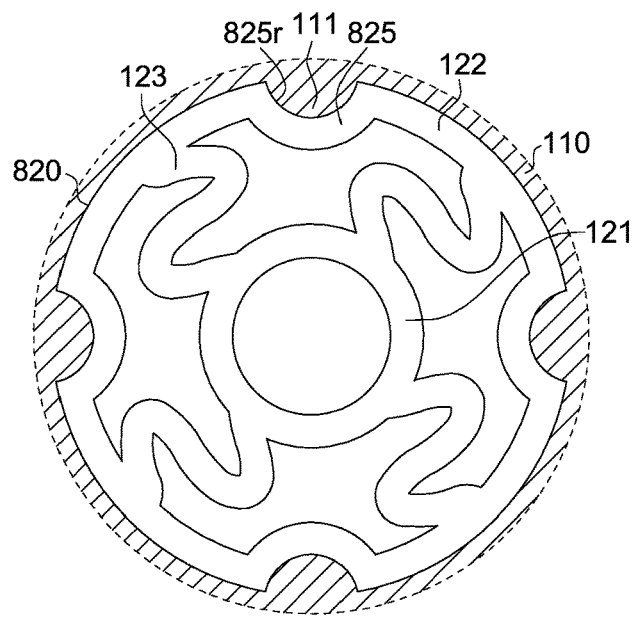
FIG. 9 is a schematic diagram of a connecting element according to another embodiment of the present invention.

FIG. 9 is a schematic diagram of a connecting element 820 according to another embodiment of the present invention. The connecting element 820 of the present embodiment is similar to the connecting elements 120 and 220 of FIG. 2 and FIG. 3, and the same element designations and symbols are used in the present embodiment. The connecting element 820 further may include a fixing portion 825. In the present embodiment, the fixing portion 825 has a recess 825*r*; the base 110 includes at least one bump 111; and the bump 111 may be disposed correspondingly to the recess 825*r*. Moreover, the fixing portion 825 may be disposed between two adjacent connecting portions 123. Or, a fixing portion 825 is disposed at an interval of two or more connecting portions 123.

In an alternate embodiment, the connecting element 820 has at least one bump (not illustrated); the base 110 has at least one recess (not illustrated); and the connecting element 820 and the base 110 lean on each other in accordance with the bump and the recess disposed correspondingly to each other. The connecting element 820 may have at least one bump (not illustrated) and at least one recess 825*r*. The base 110 may have at least one recess (not illustrated) and at least one bump 111. The bump and the recess of the connecting element 820 and the base 110 are disposed correspondingly to each other.

Figure 10:
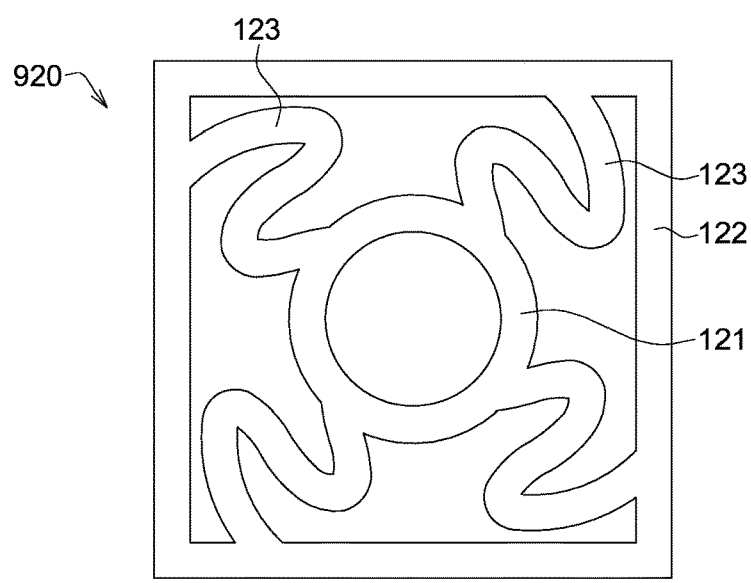
FIG. 10 is a schematic diagram of a connecting element according to another embodiment of the present invention.

FIG. 10 is a schematic diagram of a connecting element 920 according to another embodiment of the present invention. The connecting element 920 of the present embodiment is similar to the connecting element 120 of FIG. 2, and the same element designations and symbols are used in the present embodiment. In the present embodiment, the cross-section of the outer ring 122 of the connecting element 920 substantially perpendicular to the axial direction S1 is in the shape of an oblong, such as a square or a rectangle, and may also be in the shape of a polygon, such as a pentagon, a hexagon, or a triangle.

Figure 11:
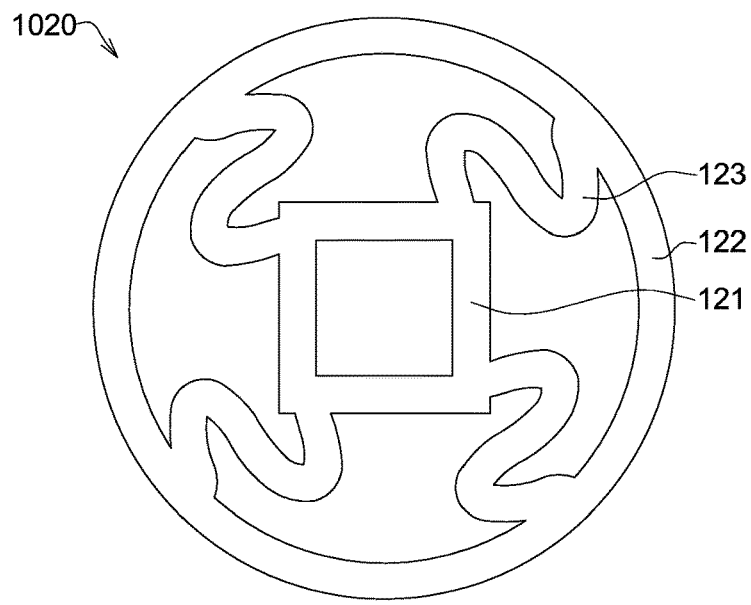
FIG. 11 is a schematic diagram of a connecting element according to another embodiment of the present invention.

FIG. 11 is a schematic diagram of a connecting element 1020 according to another embodiment of the present invention. The connecting element 1020 of the present embodiment is similar to the connecting elements 120 and 920 of FIG. 2 and FIG. 10, and the same element designations and symbols are used in the present embodiment. The cross-section of the inner ring 121 of the connecting element 1020 substantially perpendicular to the axial direction S1 is in the shape of an oblong, such as a square or a rectangle, and may also be in the shape of a polygon, such as a pentagon, a hexagon, or a triangle.

Refer to FIG. 10 and FIG. 11. To summarize, the cross-section of at least one of the inner ring 121 and the outer ring 122 substantially perpendicular to the axial direction S1 may be in the shape of an oblong, such as a square or a rectangle, and may also be in the shape of a polygon.

Figure 12:
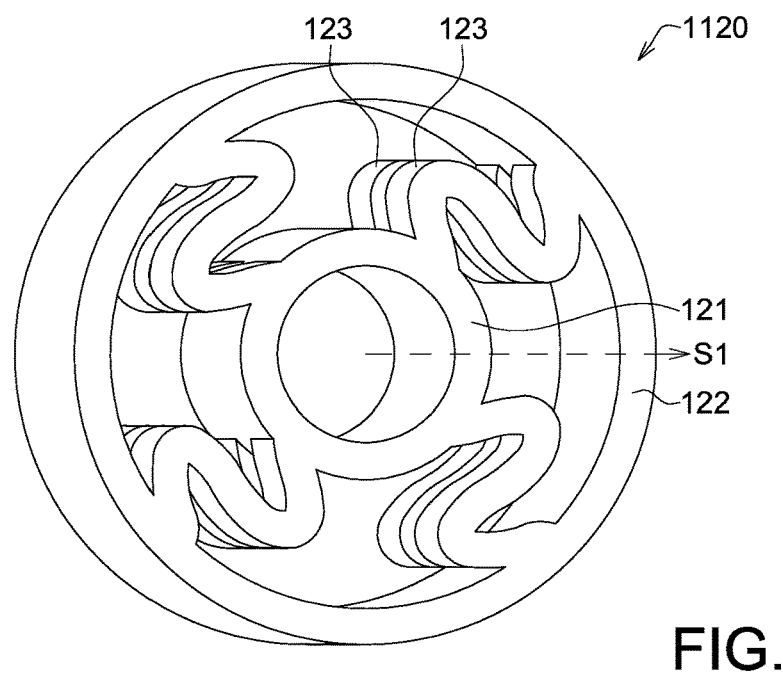
FIG. 12 is a schematic diagram of a connecting element according to another embodiment of the present invention.

FIG. 12 is a schematic diagram of a connecting element 1120 according to another embodiment of the present invention. The connecting element 1120 of the present embodiment is similar to the connecting elements 120 and 220 of FIG. 2 and FIG. 3, and the same element designations and symbols are used in the present embodiment. In the present embodiment, two or more connecting portions 123 are arranged in a row along the axial direction S1 of the connecting element 1120. In other words, the connecting portion 123 may not have to extend from one cross-section opening (not illustrated) to another cross-section opening (not illustrated) of the connecting element 1120. Several connecting portions 123 may be formed between two cross-section openings of the connecting element 1120.

Figure 13:
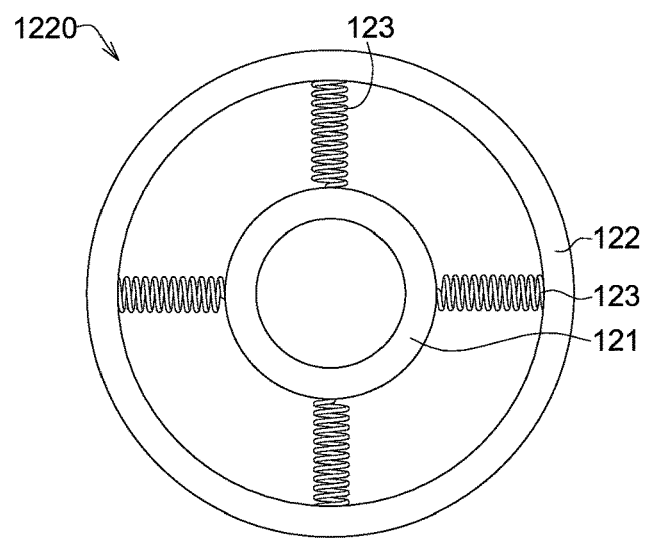
FIG. 13 is a schematic diagram of a connecting element according to another embodiment of the present invention.

FIG. 13 is a schematic diagram of a connecting element 1220 according to another embodiment of the present invention. The connecting element 1220 of the present embodiment is similar to the connecting element 120 of FIG. 2, and the same element designations and symbols are used in the present embodiment. In the present embodiment, the connecting portion 123 may be formed of an elastic member such as a compression spring or a torsion spring. Further-more, all connecting portions 123 may be formed of the same type of spring. Or, two connecting portions 123 may be formed of different types of springs. For example, some connecting portions 123 may be formed of compression springs, and some other connecting portions 123 may be formed of torsion springs. In another embodiment, one or some of the connecting portions 123 as indicated in FIG. 13 may be replaced by one or some of the connecting portions 123 of any embodiments as indicated in FIGS. 2-12.

Figure 14:
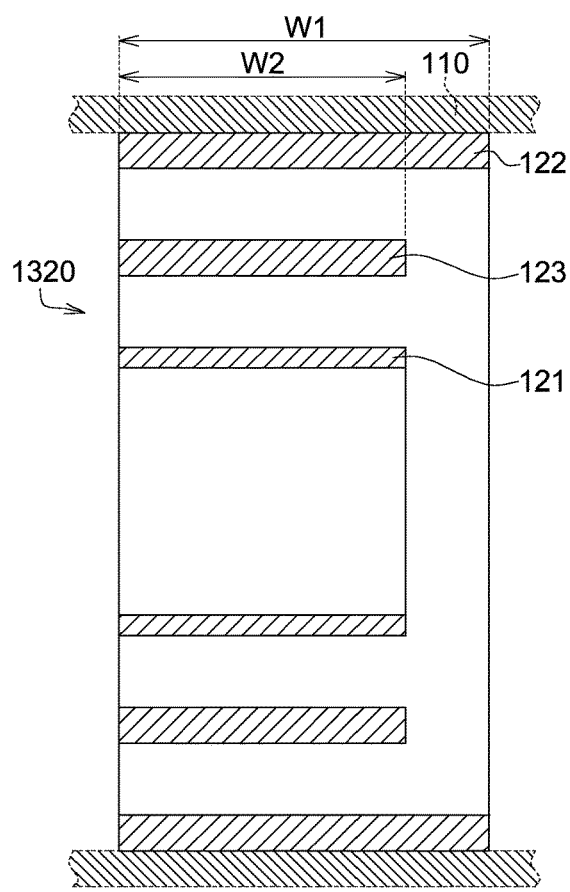
FIG. 14 is a schematic diagram of a connecting element according to another embodiment of the present invention.

FIG. 14 is a schematic diagram of a connecting element 1320 according to another embodiment of the present invention. The connecting element 1320 of the present embodiment is similar to the connecting elements 120, 220, 320, 420, 520, 620, 720, 820, 920, 1020, 1120 and 1220 of FIGS. 2-13, and the same element designations and symbols are used in the present embodiment. In the present embodiment, the width W1 of the outer ring 122 is larger than the width W2 of the inner ring 121.

Furthermore, refer to FIGS. 2-13. In another embodiment, silicone, rubber, latex, plastic, or a mixture or compound doped with at least one of silicone, rubber, latex, plastics and metal, or a material producing damping effect may be disposed or interposed between the inner ring 121, the outer ring 122 and any two connecting portions 123.

It may be known from above disclosure that the quantity of the connecting portion 123 may be singular or plural. At least some of the connecting portions 123 may be radially and/or circumferentially arranged in a direction perpendicular to the axial direction S1 and extend along the axial direction S1 of the connecting element 120. One or more connecting portions 123 of the connecting element may be arranged along the axial direction S1 of the connecting element; another one or more connecting portions 123 may be arranged along the circumference of the connecting element; one or more connecting portions 123 may also be radially arranged in a direction perpendicular to the axial direction S1. The central angle between two adjacent connecting portions 123 of the same connecting element may basically be the same or different. The connecting portions 123 may be in the form of a straight line, a curve or a combination of a straight line and a curve to connect the inner ring 121 and the outer ring 122. Or, the connecting portions 123 may interpose the space between the inner ring 121 and the outer ring 122. Meanwhile, the connecting portions 123 may not need to have a fixed form. Moreover, the material of the inner ring 121 and/or the outer ring 122 of the connecting element may be for example silicon, rubber, latex, metal, plastics, or other flexible or hard materials, and the material of the connecting portions 123 of the connecting element may be for example silicon, rubber, latex or other flexible materials. The shapes of two connecting portions 123 of the same connecting element may be the same or different. Besides, the width of the outer ring 122 and the width of the inner ring 121 of the connecting element may be different or basically the same. In short, as long as the damping effect of the connecting element may conform the demand of the image module, the quantity, arrangement, material, size and/or shape of the connecting element are not subjected to specific restrictions in the embodiments of the present invention.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image module, comprising: a connecting element comprising an inner ring, an outer ring and at least one connecting portion connecting the inner ring and the outer ring; and a lens structure comprising a barrel, the barrel passing through the inner ring, the lens structure being elastically supported by the connecting portion in a radial direction, the lens structure further comprising a lens comprising a second stopper portion leaning on the inner ring.

2. The image module according to claim 1, further comprising a base, wherein the outer ring is disposed in and leans on the base.

3. The image module according to claim 1, wherein the connecting portion is in the form of a straight line, a curve or a combination of a straight line and a curve to connect the inner ring and the outer ring.

4. The image module according to claim 1, wherein the connecting element further comprises at least one limiting portion disposed on an outer wall of the inner ring and/or an inner wall of the outer ring.

5. The image module according to claim 1, wherein the connecting element has an axial direction, and the connecting portion is arranged along the axial direction, arranged in a direction perpendicular to the axial direction and/or arranged circumferentially.

6. The image module according to claim 1, wherein the connecting portion is interposed between the inner ring and the outer ring.

7. The image module according to claim 1, wherein the inner ring, the outer ring or the connecting portion are respectively made of silicone, rubber, latex, plastic, metal, or a mixture or compound doped with at least one of silicone, rubber, latex, plastics and metal.

8. The image module according to claim 1, wherein silicone, rubber, latex, plastic, metal, or a mixture or compound doped with at least one of silicone, rubber, latex, plastics and metal is interposed or disposed between the inner ring, the outer ring or the connecting portion respectively.

9. The image module according to claim 1, wherein the lens structure comprises a barrel leaning on the inner ring, and the inner ring is disposed between a first stopper portion and a second stopper portion of the barrel.

10. The image module according to claim 1, wherein a width of the outer ring is larger than a width of the inner ring.

11. The image module according to claim 1, further comprising a base, wherein the connecting element and the base respectively have a recess and a bump disposed correspondingly to each other.

12. The image module according to claim 1, wherein the cross-section of at least one of the inner ring and the outer ring is a polygon.

13. The image module according to claim 1, wherein the outer ring and/or the inner ring comprises a radial portion and a circumferential portion, a recess is formed between the radial portion and the circumferential portion, and one end of the connecting portion is engaged with the recess.

14. An electronic device, comprising the image module according to claim 1.

15. An image module, comprising:
a base;
a connecting element comprising an inner ring, an outer ring leaning on the base and at least one connecting portion connecting the inner ring and the outer ring; and
a lens structure comprising a barrel leaning on the inner ring, and the lens structure being elastically supported by the connecting portion in a radial direction.

16. The image module according to claim 15, wherein the connecting element further comprises at least one limiting portion disposed on an outer wall of the inner ring and/or an inner wall of the outer ring.

17. The image module according to claim 15, wherein the connecting element has an axial direction, and the connecting portion is arranged along the axial direction, arranged in a direction perpendicular to the axial direction and/or arranged circumferentially.

18. The image module according to claim 15, wherein the outer ring and/or the inner ring comprises a radial portion and a circumferential portion, a recess is formed between the radial portion and the circumferential portion, and one end of the connecting portion is engaged with the recess.

19. An electronic device, comprising the image module according to claim 15.

20. An image module, comprising: a connecting element comprising an inner ring, an outer ring, at least one connecting portion connecting the inner ring and the outer ring, and at least one limiting portion disposed on an outer wall of the inner ring and/or an inner wall of the outer ring; and a lens structure comprising a barrel, the barrel passing through the inner ring, the lens structure being elastically supported by the connecting portion in a radial direction.

21. An image module, comprising: a connecting element comprising an inner ring, an outer ring and at least one connecting portion connecting the inner ring and the outer ring; a lens structure comprising a barrel, the barrel passing through the inner ring, the lens structure being elastically supported by the connecting portion in a radial direction; and a base, wherein the connecting element and the base respectively have a recess and a bump disposed correspondingly to each other.

* * * * *